(12) United States Patent
Fisk

(10) Patent No.: US 6,406,649 B1
(45) Date of Patent: Jun. 18, 2002

(54) METHOD FOR FORMING A BIODEGRADABLE FOAMED PRODUCT FROM STARCH

(76) Inventor: Donald Fisk, 352 River Trace Dr., Marion, AR (US) 72364

( * ) Notice: Subject to any disclaimer, the term of this patent is extended or adjusted under 35 U.S.C. 154(b) by 0 days.

(21) Appl. No.: 09/709,023

(22) Filed: Nov. 8, 2000

Related U.S. Application Data

(60) Provisional application No. 60/164,408, filed on Nov. 9, 1999.

(51) Int. Cl.[7] .............................................. B29C 44/02
(52) U.S. Cl. ........................................... 264/51; 264/53
(58) Field of Search ........................... 264/51, 53, 45.9; 425/233, 335

(56) References Cited

U.S. PATENT DOCUMENTS

| | | | | |
|---|---|---|---|---|
| 3,137,592 A | * | 6/1964 | Protzman et al. | 127/71 |
| 4,863,655 A | * | 9/1989 | Lacourse et al. | 264/53 |
| 5,035,930 A | * | 7/1991 | Lacourse et al. | 428/35.6 |
| 5,043,196 A | * | 8/1991 | Lacourse et al. | 428/35.6 |
| 5,523,372 A | | 6/1996 | Fisk | 527/313 |
| 5,602,188 A | * | 2/1997 | Nakanishi | 521/82 |
| 5,645,871 A | * | 7/1997 | Berns et al. | 264/508 |
| 5,843,544 A | * | 12/1998 | Andersen et al. | 428/318.8 |
| 5,853,848 A | * | 12/1998 | Fisk | 428/143 |
| 5,916,503 A | * | 6/1999 | Rettenbacher | 264/45.3 |
| 6,106,753 A | * | 8/2000 | Redd et al. | 264/321 |
| 6,251,318 B1 | * | 6/2001 | Arentsen et al. | 264/45.5 |

* cited by examiner

Primary Examiner—Allan R. Kuhns
(74) Attorney, Agent, or Firm—Bierman, Muserlian and Lucas

(57) ABSTRACT

Traveling molds are used in conjunction with an extruder to form foamed products from starch and/or starch/polymer blends.

6 Claims, 2 Drawing Sheets

METHOD FOR FORMING A BIODEGRADABLE FOAMED PRODUCT FROM STARCH

This application claims the priority under 35 USC 119(e) of U.S. provisional patent application Serial No. 60/164,408 filed Nov. 9, 1999.

BACKGROUND OF THE INVENTION

1. Field of the Invention

This invention relates to a process for making a biodegradable foamed product from starch using an extruder with traveling molds which close around the nozzle of the extruder to provide a continuous molding process using a plurality of individual molds.

2. Related Art

Foamed products, which are often referred to as structural foam, cellular polymer, cellular plastic, plastic foam, foamed plastic and expanded plastic, are products generally made from a plastic composition and have a cellular structure.

A major commercial use of foamed products is in the field of packaging. Styrofoam, a foamed polystyrene product, is a well-known foamed product used for packaging. Such packaging material is used to cushion and prevent damage to the contents of a package.

Conventionally, foamed products are made by fluidizing a plastic composition, forming a cellular structure by means of a blowing agent in the fluidized plastic composition, and then hardening the composition to retain the cellular structure created by the blowing agent.

Blowing agents, sometimes referred to as foaming agents, are substances that produce the cellular structure in the fluidized plastic composition. Conventional blowing agents include fluorocarbons, nitrogen gas, hydrazine derivatives, trihydrazide triazine, 5-phenyl tetrazole, p-toluene sulfonyl semicarbazide, modified azodicarbonamide, and azodicarbonamide. Chemical blowing agents are a class of blowing agents which are solids or liquids at room temperature and, upon heating, release a gas. Typically, they are employed by mixing the chemical blowing agent with the solid plastic material and heating the mixture while maintaining the mix under pressure. Heating fluidizes the plastic material and causes the blowing agents to release a gas. The gas forms bubbles or cells in the fluid plastic material. The mixture is maintained under pressure until it is placed into a mold where the gas expands and in turn causes the fluid plastic material to expand. Upon solidifying, the cell structure remains. Different blowing agents release gas at different temperatures and the choice of blowing agent depends on the processing conditions, plastic material and the size of the desired gas cells. When starch is used to make the foamed product, water is typically used as the blowing agent.

Chemical blowing agents have the advantage over gaseous blowing agents in that they can be added to the solid plastic material prior to heating. Gaseous blowing agents such as nitrogen and some fluorocarbons must be injected into the already fluidized plastic material.

Packaging materials made from synthetic polymers, such as polystyrene, have come under attack due to their non-biodegradable nature. With mounting pressure on manufacturers to produce a biodegradable product, more and more manufacturers are seeking alternative sources for conventional synthetic polymers. Natural polymers such as cellulose and starch have been the main contenders as replacements for the synthetic polymers.

It has been suggested to use starch and modified starch to make foamed products. For example, U.S. Pat. No. 3,137,592 teaches extruding starch with a plasticizer, preferably water, such that the plasticizer flashes as the fluidized starch exits the die of the extruder. The flashing of the plasticizer causes puffing or expanding of the fluidized starch and the formation of a porous mass. The amount of plasticizer ranges from 22% to 67% based on the dry weight of starch. The temperature during extrusion ranges from 125° C. to 250° C. with a working temperature range of 150° C. to 160° C.

International Application Publication No. WO83/02955 teaches making a foamed starch product by extruding a composition of starch with a moisture content of 12–20% by weight starch with a gas forming or gas generating agent (blowing agent) at a temperature of 60–220° C. Such an expanded starch product is taught as being useful as a packaging material to replace polystyrene foam or as a snack food if mixed with flavorings and the like. Potato starch is used in the example to produce the foamed product.

U.S. Pat. Nos. 4,863,655; 5,035,930; and 5,043,196 teach making a biodegradable foamed packaging material from a high amylose starch. These patents teach that the foamed packaging material is prepared by extruding high amylose starch having a moisture content of 10% to 21% by weight at a temperature of 150° C. to 250° C. According to these patents, both unmodified and modified starch can be used to make the packaging material. The types of modified starches taught by these patents are esterified, etherified, oxidated, crosslinked, enzyme converted and acid hydrolysized. The etherified high amylose starches, and specifically hydroxypropylated high amylose starch, are the main focus of these patents.

Starch graft copolymers have been suggested for use in making a foamed starch product, see for example, U.S. Pat. Nos. 5,523,372 and 5,853,848. Starch graft copolymers are biodegradable. They are made from starch and a synthetic monomer such as vinyl or acrylic.

Additionally, because starch and starch based materials can be combined with other synthetic plastic materials, there has been a great interest in the use of these materials to make a biodegradable material.

The use of natural polymers such as starch and starch graft copolymers to make biodegradable foamed products, however, have not been widely utilized because of certain problems experienced during their extrusion.

One of the problems that inhibits starch foam technology is the manner by which starch materials react upon emergence from the die in the extrusion process. For the foaming action to take place, the temperature, shear and pressures must be achieved in the barrel of the extruder so as to cause the starch to liquefy. In this liquefied state, starch is capable of forming a film. Various polymers and additives are often combined with the starch. They are used to encourage thin yet stronger cell walls, thus enabling lower foam bulk densities with acceptable properties. The foaming action occurs as the material emerges from the die resulting in immediate expansion after emerging from the extruder die.

Two distinct problems arise when molding these foams. First, the conversion of these materials into foams must occur at a continuous rate because of the nature of the extrusion expansion process, however, molds are generally not available on a continuous basis. Typically, an individual mold is supplied to the die, fluidized material is injected into the mold via the die, the mold is moved away from the die, and another mold is then provided to the die. Thus, the die does not continuously eject the starch. The second problem is the fact that upon emergence from the extruder these foams immediately cool on the surface and tend to retain their shape. This inhibits the manufacture of parts that are larger than the initial expansion size reached as the material emerges from the die opening. It also inhibits the production of parts that are complicated designs.

Additionally, starch is not a thermoplastic material, thus, although it is compatible with synthetic polymers, it does not melt in the same manner or behave in the same way as the synthetic polymers do in the extruder.

In part, this problem has been overcome through the use of processing aids such as water, glycerin products, urea, and many other compounds known to soften the starch granule in the art of starch processing.

Water is especially useful in the production of foamed articles as it causes rapid gelatinization of starch. This also provides for extensive foaming action at the low moisture levels necessary for desired foam characteristics, even when using high percentages of starch. During the foaming process, the elevated temperatures, shear and pressures associated with extrusion creates an excellent environment for rapid cell development. Specific moisture percentages and nucleating agents are used to control cell size. Foaming agents may also be used, however, during most extrusion processes, many foaming agents that are compatible to biodegradable materials and starch do not activate quickly enough to have measurable effect on items such as loose fill.

Thus far, these difficulties in the extrusion process have limited the use of materials containing high load levels of starch to elementary foam products for basic foam applications such as loose fill. Some rigid sheet products are being produced in sizes and properties of limited scope. Until now, molded articles produced in economical continuous or large scale production techniques have been very difficult to achieve.

Extruders with traveling molds are know, see for example, U.S. Pat. No. 5,645,871. The '871 patent teaches making plastic pipes from synthetic polymers. The teachings of the '871 patent are incorporated herein by reference. Traveling molds are generally used for production of continuous parts such as pipes, where the finished product has a continuous shape.

There is a need for commercially feasible operation for making a biodegradable foamed product from starch and starch based compositions.

SUMMARY OF THE INVENTION

Applicant has discovered that, by using an extruder with a plurality of individual traveling molds which close around the extruder's nozzle and are interconnected to allow for continuous extrusion of the starch material, a commercially feasible process for making foamed starch products is obtained. These individual traveling mold blocks prevent the formation of a skin and slow the loss of moisture, thereby aiding the adhesion of the foam into a continuous phase and providing for a uniform molded foam starch product with complicated shapes.

Water can be injected into the die, preferably as a mist or steam, to keep the foam wet enough to allow it to congeal into one uninterrupted phase in the mold. Foaming agents can also be used to delay the expansion of the foam in the mold and to assist the foam in completely filling the mold cavity. These foaming agents are known to modify the properties of the foam product such as resiliency, compression rate, and surface tension.

Traveling molds are conventional pieces of equipment which are operated in a conventional manner. The traveling molds comprise a plurality of individual, separate molds on a continuous track. Each mold is made up of a pair of mold halves which, when joined, form a cavity therein. The cavity has the shape of the foamed article. The pair of mold halves are joined about the nozzle of the extruder. The extruded starch material is injected into the mold such that the cavity is filled. A vacuum can be applied to the mold cavity to assist in the filling of the cavity. The closed mold continues to travel along the track while the starch material in the mold cools and cures to form the finished foamed starch product. Once cooling is completed, the mold pair opens and the formed individual foamed starch product is removed. Ejection devices can be employed to assist in the removal of the product from the mold cavity. The two mold halves then travel back to the extruder nozzle to be closed and start the process again.

A plurality of molds are employed such that individual molds are continuously supplied to the nozzle. Each mold, at a center point, has an opening which, when it is aligned with the mold in front of it and behind it, is aligned with an identical opening in the other mold. In this way each mold forms a separate mold cavity, yet each cavity is connected to the cavity in the other molds when they are in the closed state. The starch material is continuously extruded from the nozzle without any interruption and each formed product in each cavity is connected to the other foamed product in the immediate adjacent cavity via the starch which accumulates in the openings between adjacent molds. The tailing which is formed in the opening will generally break off of the cured foamed starch product when the mold is opened to release the foamed product. Alternatively, it is trimmed off of the product using a knife or other conventional cutting utensil. The speed of travel of the molds will be determined by and synchronized with the throughput of the extruder and the volume of the foam required by the size of the part. The speed of the ejection of the foamed product by the die can also vary in speed to coincide with the speed of travel of the molds.

Broadly, the process of the present invention entails forming a shaped foamed article from starch comprising:

(a) forming a composition comprising starch, water and a blowing agent;

(b) heating said composition under pressure in an extruder to gelatinize said starch wherein said extruder has a nozzle;

(c) providing a plurality of separate molds on a continuous path to said extruder, each said mold comprising a pair of mold halves with a void therein such that when said mold halves are joined to form said mold, said void has the shape of said shaped foamed article;

(d) joining each of said mold halves to form said mold about said nozzle of said extruder;

(e) extruding said composition through said nozzle into said void of said mold such that said composition foams and fills said void;

(f) cooling said foamed composition in said mold to form a shaped foamed article; and (g) opening said mold into said pair of mold halves to recover said foamed shaped article and returning said pair of mold halves to said nozzle.

The starch used in the process can be an unmodified starch, a modified starch, or a mixture thereof. More preferably, the modified starch is an esterified starch, etherified starch, oxidized starch, crosslinked starch, or a combination thereof. The more preferred modified starch is a starch graft copolymer.

The composition can also include other components such as synthetic polymers, processing aids, fire retardants, emulsifiers or mixtures thereof.

Suitably, the starch can be a high amylose (greater than 30%) starch, an esterified high amylose starch, an etherified high amylose starch, an oxidized high amylose starch, a cross-linked high amylose starch, or a combination thereof.

Suitable synthetic polymers which can be used in the composition include polystyrene, polyethylene, polypropylene, poly(ethylene terephthalate) (PET). The synthetic polymer is combined with the starch to form the foamed product.

BRIEF DESCRIPTION OF THE DRAWINGS

These and other aspects of the present invention may be more fully understood by reference to one or more of the following drawings wherein.

DETAILED DESCRIPTION OF THE INVENTION

Figure 1:
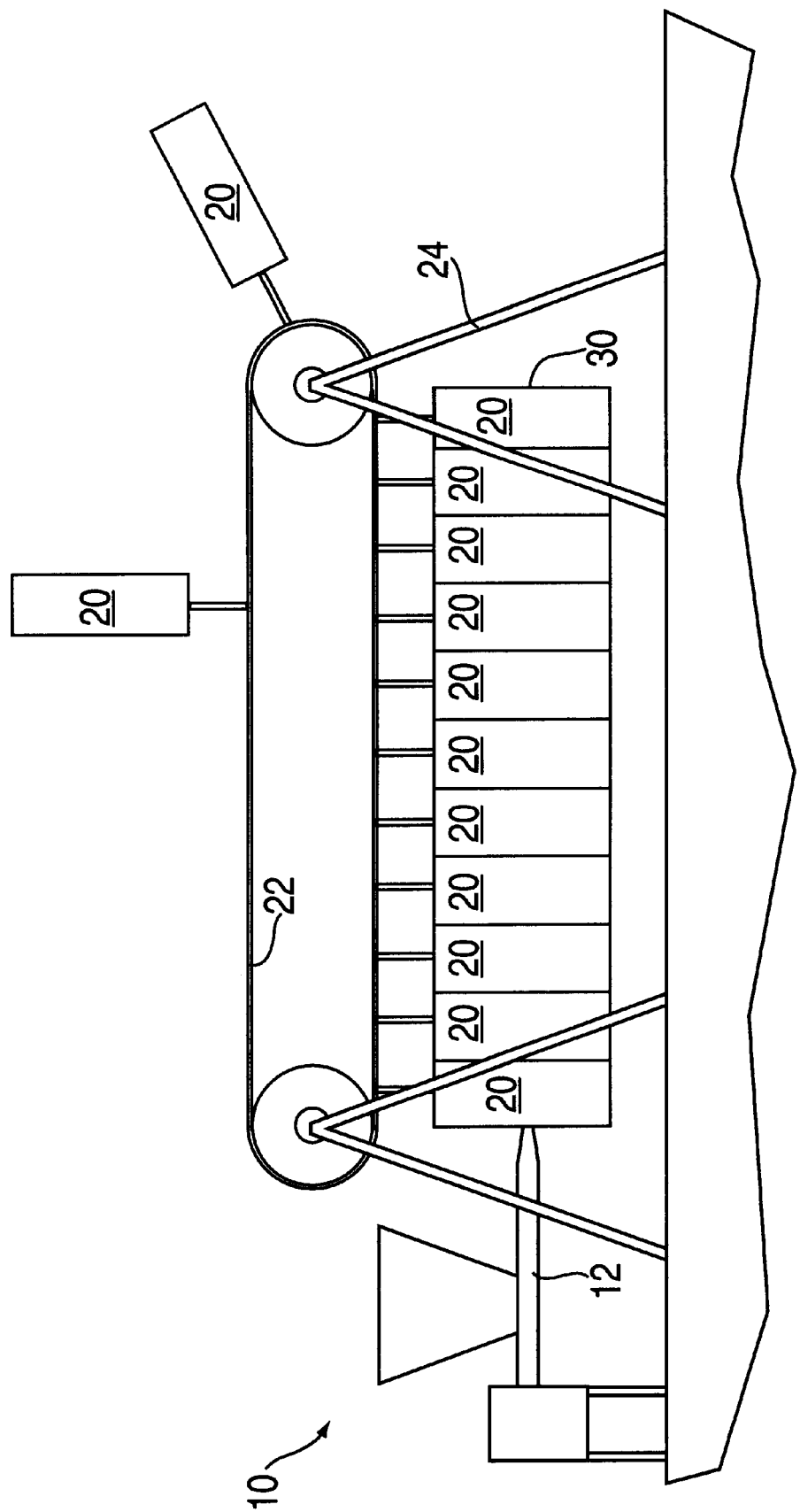
FIG. 1 is a side view of the process and equipment employed in the present invention.

FIG. 1 illustrates extruder 10 having nozzle 12 through which starch material is ejected into mold 20. Mold 20 travels a continuous loop 22 which is supported by frame 24.

Figure 2:
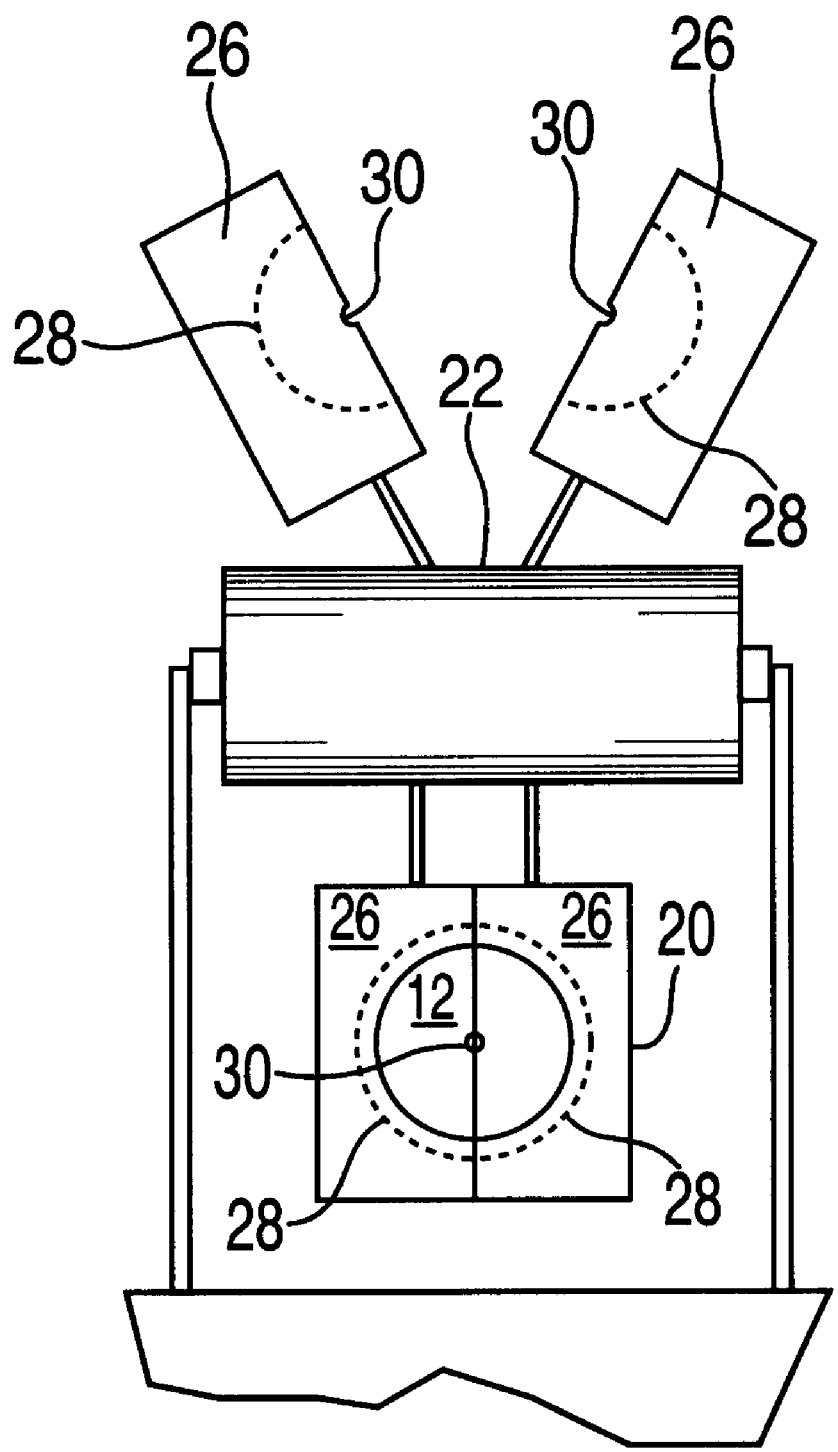
FIG. 2 is a front view of the equipment in FIG. 1.

FIG. 2 illustrates a front view where mold 20 is divided between mold pair 26 having cavity 28 therein. Each mold 20 has opening 30. Opening 30 in one mold 20 is aligned with opening 30 in adjacent mold 20 such that they align to create one continuous hole throughout all mold 20 as shown in FIG. 1.

Traveling molds are conventional pieces of equipment which are employed in accordance with the present invention in a conventional manner.

It will be understood that the claims are intended to cover all changes and modifications of the preferred embodiments of the invention herein chosen for the purpose of illustration which do not constitute a departure from the spirit and scope of the invention.

What is claimed is:

1. A method for forming a shaped foamed article from starch comprising:
   (a) forming a composition comprising starch, water and a blowing agent;
   (b) heating said composition under pressure in an extruder to gelatinize said starch wherein said extruder has a nozzle;
   (c) providing a plurality of separate molds on a continuous path to said extruder, each said mold comprising a pair of mold halves with a void therein such that when said mold halves are joined to form said mold, said void has the shape of said shaped foamed article, each mold has an opening which connects a void in one mold with a void in an adjacent mold;
   (d) joining each of said mold halves to form said mold about said nozzle of said extruder;
   (e) continuously extruding said composition through said nozzle into said void of said mold such that said composition foams and fills said void;
   (f) cooling said foamed composition in said mold to form a shaped foamed article; and
   (g) opening said mold into aid pair of mold halves to recover said foamed shaped article and returning said pair of mold halves to said nozzle.

2. The method of claim 1 wherein said starch is an unmodified starch, a modified starch, or a mixture thereof.

3. The method of claim 2 wherein said modified starch is an esterified starch, etherified starch, oxidized starch, crosslinked starch, or a combination thereof.

4. The method of claim 2 wherein said starch is a starch graft copolymer.

5. The method of claim 2 wherein said starch is a high amylose (greater than 30%) starch, an esterified high amylose starch, etherified high amylose starch, oxidized high amylose starch, crosslinked high amylose starch, or a combination thereof.

6. The method of claim 2 wherein said composition further comprises a synthetic polymer selected from the group consisting of polystyrene, polyethylene, polypropylene, and P.E.T.

* * * * *